2,723,273
Patented Nov. 8, 1955

2,723,273

1-GAMMA-GLUTAMYL-2 ISONICOTINOYL HYDRAZINES

Edward F. Rogers, Oxford, England, assignor to Merck & Co., Rahway, N. J., a corporation of New Jersey No Drawing. Application May 29, 1953,
Serial No. 358,555

13 Claims. (Cl. 260—295)

This invention relates to derivatives of isonicotinic acid hydrazide. More particularly, it is concerned with novel pyroglutamic acid derivatives of isonicotinic acid hydrazide having antituberculous activity.

Although the fight against tuberculosis has made constant progress, this terrible disease has not been completely conquered. Many noteworthy gains have been made however, due in part to improved diets and better living conditions. In addition, the availability in recent years of chemotherapeutic agents which inhibit the growth of the tubercle bacillus have aided greatly in this continuing battle. However, no drug or combination of drugs has been found to be completely successful against tuberculosis in all instances due to undesirable side effects and the development of drug resistant strains of the tubercle bacillus. Therefore, new and improved antituberculous drugs are needed to attack this dread disease.

It is an object of this invention therefore, to provide novel compounds having activity against the tubercle bacillus. A further object is to provide novel compounds useful in the treatment of tuberculosis. Another object is to provide processes for producing these novel compounds. Other objects will be apparent from the following description of this invention.

According to the present invention it is now found that 1-γ-glutamyl-2-isonicotinoyl hydrazine having the formula:

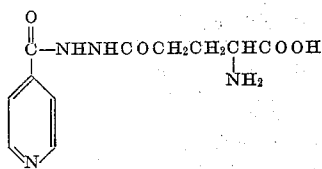

and salts and esters thereof possess antituberculous activity and are useful against this disease.

It has now been discovered that 1-γ-glutamyl-2-isonicotinoyl hydrazine is produced by reacting isonicotinic acid hydrazide with pyroglutamic acid. This reaction may be illustrated as follows:

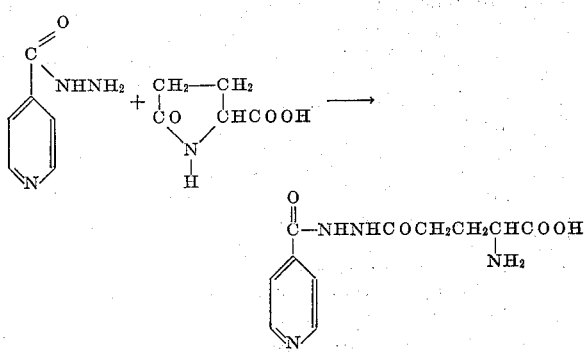

The reaction of isonicotinic acid hydrazide with pyroglutamic acid is readily effected by intimately contacting the reactants, preferably in a suitable solvent medium. In this regard, water has been found to be particularly useful for this purpose although inert organic solvents may also be used satisfactorily. The reaction is conveniently carried out at room temperature although temperatures up to about 75° C. may be employed if desired. When water is used as the solvent 1-γ-glutamyl-2-isonicotinoyl hydrazine may be most conveniently produced by uniting the reactants in water and permitting the mixture to stand until the desired product precipitates from solution. Under such conditions the reaction and crystallization proceed slowly, often taking a week or more. The time cycle may be shortened by using elevated reaction temperatures. After the crystallization has been completed the product can be isolated and purified by conventional methods.

In the practice of this invention the pyroglutamic acid employed as starting material may be readily produced by the application of methods reported in the literature. However, pyroglutamic acid contains an asymmetric carbon atom and may therefore exist either in the form of optically active D and L isomers or as a mixture of these isomers such as racemic pyroglutamic acid. The 1-γ-glutamyl-2-isonicotinoyl hydrazine prepared from either of the stereoisomeric forms of pyroglutamic acid or mixtures of these stereoisomers are active tuberculostatic agents. Accordingly, by selecting the appropriate form of pyroglutamic acid for reaction with isonicotinic acid hydrazide either 1-DL-γ-glutamyl-2-isonicotinoyl hydrazine, 1-D-γ-glutamyl-2-isonicotinoyl hydrazine or 1-L-γ-glutamyl-2-isonicotinoyl hydrazine may be produced.

One method for the preparation of DL-pyroglutamic acid is reported in the J. Biol. Chem. 171, 387 (1947) while a preparation of L-pyroglutamic acid is disclosed in the J. Am. Chem. Soc. 64, 1021 (1942). In addition, the D and L isomers may be produced by the resolution of DL-pyroglutamic acid according to an adaptation of the process disclosed in U. S. Patent No. 2,528,267, wherein L-pyroglutamic acid is used to resolve racemic amines. For example, when an optically active form of an amine, resolved according to this patent, is reacted with DL-pyroglutamic acid the resulting D and L pyroglutamic acid amine salts may be separated by fractional crystallization.

Salts of 1-γ-glutamyl-2-isonicotinoyl hydrazines may be readily prepared by the application of conventional methods. For example, alkali metal and alkaline earth metal salts of 1-γ-glutamyl-2-isonicotinoyl hydrazine may be conveniently prepared by reacting an alkali metal or alkaline earth metal carbonate, bicarbonate, hydroxide or alkoxide with 1-DL, D or L-γ-glutamyl-2-isonicotinoyl hydrazine, preferably in an aqueous or alcoholic medium. Salts which are prepared in this manner that might be mentioned are the sodium, potassium, calcium and magnesium salts of 1-DL, D, and L-γ-glutamyl-2-isonicotinoyl hydrazine.

Alkyl, aryl and aralkyl esters may be conveniently produced by reacting 1-γ-glutamyl-2-isonicotinoyl hydrazine with the corresponding alcohol in the presence of a small amount of a non-oxidizing mineral acid. Examples of such esters are the methyl, ethyl, propyl, phenyl and benzyl esters of 1-DL, D or L-γ-glutamyl-2-isonicotinoyl hydrazine and the like. Furthermore, acid addition salts of 1-γ-glutamyl-2-isonicotinoyl hydrazine, such as hydrochloride, sulfate, acetate, oxalate, and the like, are prepared by reacting the hydrazine with the corresponding acid.

The 1-γ-glutamyl-2-isonicotinoyl hydrazines and the salts and esters thereof have valuable medicinal properties and are especially active against tuberculosis. The antituberculous activity of the novel compounds forming this invention was experimentally demonstrated by administering representative compounds to animals infected with tuberculosis.

According to one particular test, groups of white Swiss mice, Barckmann IS-32 strain averaging about 17 gm. per mouse, were infected with *Mycobacterium tuberculosis*. The mice were infected by injecting them intravenously with 0.25 ml. of a culture medium of the $H_{37}R_v$ strain of *M. tuberculosis*, human type, adjusted with sterile distilled water to permit 70% transmission of light at 620 mu. One day after infection the compounds to be tested were administered to the mice at a predetermined concentration incorporated in the normal mouse diet. Additional groups of mice were also included in the test for control purposes. Thus, one group of infected mice was administered isonicotinic acid hydrazide as a positive control. Another group of infected mice which received no drug formed an infected control while an additional group of mice which was neither infected nor administered a drug comprised a normal control.

The test was allowed to continue until either 50% of the infected controls died or for a maximum of about 50 days. It has been determined by experience that the results obtained from tests terminated when either of these events first occurs are of optimum value in evaluating the activity of drugs. The mice which died during the course of the experiment, as well as those surviving the end of the test period, were autopsied and the lungs preserved in 10% formalin. After a minimum of 48 hours of fixation the lungs were observed to determine the per cent of lung tissue grossly involved with tuberculosis. The following results were obtained:

TEST 1

| Drug | Drug Concentration, Percent | No. of Mice Surviving Test Period | Percent of Lung Tissue Involved |
| --- | --- | --- | --- |
| 1-L-γ-glutamyl-2-isonicotinoyl Hydrazine | 0.01 | 8 of 8 | 3 |
| 1-DL-γ-glutamyl-2-isonicotinoyl Hydrazine | 0.01 | 8 of 8 | 0 |
| Isonicotinic Acid Hydrazide | 0.01 | 8 of 8 | 0 |
| Infected Control | None | 7 of 8 | 28 |
| Normal Control | None | 8 of 8 | 0 |

The duration of the test was 48 days.

TEST 2

| Drug | Drug Concentration, Percent | No. of Mice Surviving Test Period | Percent of Lung Tissue Involved |
| --- | --- | --- | --- |
| 1-L-glutamyl-2-isonicotinoyl Hydrazine | 0.05 | 8 of 8 | 0 |
| Isonicotinic Acid Hydrazide | 0.01 | 8 of 8 | 0 |
| Infected Control | None | 2 of 7 | 45 |
| Normal Control | None | 8 of 8 | 0 |

The duration of the test was 25 days.

The stock diet received by all groups of mice, not including drugs, consisted of:

| | Per cent |
| --- | --- |
| Yellow cornmeal | 30 |
| Whole wheat flour | 29 |
| Casein, technical | 10 |
| Soybean meal | 10 |
| Linseed oil meal | 7 |
| Yeast, dried brewers | 5 |
| Alfalfa meal | 2 |
| NaCl | 0.5 |
| $CaCO_3$ | 0.5 |
| Mazola oil | 3 |
| Cod liver oil | 3 |

10 mg. of vitamin $B_2$/kg.

In the evaluation of drugs for safety one criteria commonly used is the therapeutic index which is generally defined as the ratio of lethal dose required to kill one-half of a group of test animals ($LD_{50}$) to the effective dose ($ED_{50}$) required to protect one-half of a group of test animals from the adverse effects of a disease. This ratio is always greater than 1. Obviously, a high therapeutic index is desired in a drug since it permits the administration of doses substantially greater than the minimum effective dose without endangering life. In addition, the ability to administer higher doses allows a more rapid treatment and permits effective treatment of particularly virulent outbreaks of a disease.

It was therefore surprising to find that 1-DL, D and L-γ-glutamyl-2-isonicotinoyl hydrazine have therapeutic indices of about 100 which is about 2 to 3 times greater than the therapeutic index of isonicotinic acid hydrazide. Accordingly, larger doses of the novel products of this invention may be administered safely, thereby retarding the development of drug resistant strains of the tubercle bacillus and permitting a more concentrated course of treatment.

According to a further embodiment of this invention novel pharmaceutical compositions useful against tuberculosis are provided containing a 1-DL, D or L-γ-glutamyl-2-isonicotinoyl hydrazine, salt or ester thereof as the active ingredient. Such compositions are conveniently produced by intimately combining at least one of the active antituberculous compounds with a suitable carrier.

The carrier used in producing such compositions may be either a liquid or a solid. Thus, satisfactory liquid compositions are formed by dissolving the active ingredient in a suitable liquid diluent such as water or an oil like sesame oil or olive oil or mixtures thereof. Solubilizers and emulsifiers can be added, if desired, to maintain a satisfactory solution or suspension. In addition, flavoring agents and coloring matter may be added for esthetic purposes. The resulting liquid compositions may then be administered in various conventional forms such as in oral drops, gelatin filled capsules, syrups or as parenteral injectable liquids.

Solid compositions are conveniently produced by combining the active ingredient with a solid carrier. In preparing such compositions those solid carriers may be used which are inert and not harmful to the animal body. Examples of suitable carriers are cornstarch, sugar, talc, magnesium carbonate and the like. By the application of known methods such compositions may be conveniently produced in a number of physical forms some of which are powders, tablets and filled capsules. An example of a typical tablet may have the composition: drug, 0.050 gm., magnesium carbonate, 0.250 gm., gelatin, 0.025 gm., sucrose, 0.100 gm., magnesium stearate, 0.005 gm., and talc, 0.010 gm.

Compositions of the types described may be produced having a wide variety of concentrations of one or more of the novel active compounds. Such compositions may be produced, therefore, to suit any particular purpose or degree of tuberculosis involvement. In addition, compositions may be produced containing other active ingredients besides the novel compounds of this invention such as streptomycin, dihydrostreptomycin, para amino salicylic acid and isonicotinic acid hydrazide and various combinations of these and other antibiotics.

Compositions can also be prepared which are particularly suitable for administration to animals infected with tuberculosis. Thus, the active compounds may be administered in compositions comprising a suitable animal feed-stuff having incorporated therein at least one of these novel antituberculous agents.

The following examples illustrate specific methods of preparing these novel compounds.

EXAMPLE 1

*Production of 1-L-γ-glutamyl-2-isonicotinoyl hydrazine*

To a solution of 1.37 gm. of isonicotinic acid hydrazide in 4 ml. of water is added 1.29 gm. of L-pyroglutamic acid. The mixture is allowed to stand one week at room temperature during which crystalline 1-L-γ-glutamyl-2-isonicotinoyl hydrazine deposited. The product is removed by filtration, washed with a small volume of water and air-dried. After recrystallization from water-methanol it had a melting point of 200–201° C.

The sodium salt of 1-L-γ-glutamyl-2-isonicotinoyl hydrazine is prepared by dissolving the hydrazine in water, adding an equivalent amount of sodium hydroxide to the mixture and evaporating to dryness. In a like manner, other salts such as the potassium, calcium and magnesium salts of 1-L-γ-glutamyl-2-isonicotinoyl hydrazine are prepared.

EXAMPLE 2

*Production of 1-DL-γ-glutamyl-2-isonicotinoyl hydrazine*

To a solution of 18.8 gm. of isonicotinic acid hydrazide in 50 ml. of water is added 20 gm. of DL-pyroglutamic acid. The reaction mixture is allowed to stand at room temperature for 11 days during which crystalline 1-DL-γ-glutamyl-2-isonicotinoyl hydrazine separates from solution. The product is recovered by filtration and air-dried. Purification of the compound is effected by dissolving it in water and adding methanol to precipitate the product. The purified compound melts at 191° C.

The ethyl ester of 1-DL-γ-glutamyl-2-isonicotinoyl hydrazine is prepared by adding 1-DL-γ-glutamyl-2-isonicotinoyl hydrazine to an excess of ethanol containing a small amount of sulfuric acid. After heating the mixture with stirring for about an hour the desired ester is recovered by distilling off the ethanol. Other esters such as the methyl, butyl, benzyl and phenyl esters are prepared in this way.

Alkali metal and alkaline earth metal salts of 1-DL-γ-glutamyl-2-isonicotinoyl hydrazine are conveniently produced by the method disclosed in Example 1.

Various changes and modifications in the procedures herein disclosed will occur to those skilled in the art, and to the extent that such changes and modifications are embraced by the appended claims, it is to be understood that they constitute part of my invention.

What is claimed is:

1. A compound selected from the class consisting of 1-γ-glutamyl-2-isonicotinoyl hydrazine and its alkali metal and alkaline earth metal salts and lower alkyl esters.
2. 1-γ-glutamyl-2-isonicotinoyl hydrazine.
3. 1-DL-γ-glutamyl-2-isonicotinoyl hydrazine.
4. 1-D-γ-glutamyl-2-isonicotinoyl hydrazine.
5. 1-L-γ-glutamyl-2-isonicotinoyl hydrazine.
6. Sodium 1-γ-glutamyl-2-isonicotinoyl hydrazine.
7. Potassium 1-γ-glutamyl-2-isonicotinoyl hydrazine.
8. Lower alkyl esters of 1-γ-glutamyl-2-isonicotinoyl hydrazine.
9. Ethyl-1-γ-glutamyl-2-isonicotinoyl hydrazine.
10. The process of producing 1-γ-glutamyl-2-isonicotinoyl hydrazine which comprises reacting pyroglutamic acid with isonicotinic acid hydrazide.
11. The process of producing 1-DL-γ-glutamyl-2-isonicotinoyl hydrazine which comprises reacting DL-pyroglutamic acid with isonicotinic acid hydrazide.
12. The process of producing 1-L-γ-glutamyl-2-isonicotinoyl hydrazine which comprises reacting L-pyroglutamic acid with isonicotinic acid hydrazide.
13. The process of producing 1-D-γ-glutamyl-2-isonicotinoyl hydrazine which comprises reacting D-pyroglutamic acid with isonicotinic acid hydrazide.

No references cited.